Feb. 16, 1932. J. F. RUDE 1,845,936
SPIDER WHEEL FOR HARROWS
Filed Feb. 27, 1930

Inventor
John F. Rude
By Frank C. Gore
Attorney

Patented Feb. 16, 1932

1,845,936

UNITED STATES PATENT OFFICE

JOHN F. RUDE, OF INDIANAPOLIS, INDIANA

SPIDER WHEEL FOR HARROWS

Application filed February 27, 1930. Serial No. 431,779.

This invention relates to an improved "spider wheel" for use in connection with harrows, cultivators, and other agricultural machines which have earth-treating means.

The present invention is particularly useful in connection with a rotary hoe or mulcher for cultivating and mulching corn, wheat, cotton, oats, soy beans, mint, alfalfa, beets, and other crops, for instance to machines of the general type disclosed in my Patent No. 1,689,053 dated October 23, 1928.

My present spider wheel embodies improvements over spider wheels heretofore known to the art, in the following particulars: the provision of a single disc, teeth which are of angle steel shape in cross section and are curved and pointed, as well as being alternately located on opposite sides of the disc, riveted to the disc at a plurality of points, and have their inner ends abutting the hub of the disc.

The construction provided permits ready repairing, complete independence of each tooth, very secure fastening of the teeth, great strength because of the angle iron construction and the abutment of the teeth against the hub, and adaptability of the teeth to sharpen themselves automatically as they enter the earth or soil.

In my improvements, no special seats or fasteners are required for the teeth nor are there any parts which can "jam" or become so rusted that removal of a tooth is difficult, as has been the case with earlier constructions.

Screw fastenings or bolts may be used in lieu of rivets for securing the teeth to the disc.

The two series of teeth located on opposite sides of the disc improve the treatment of the soil over what would be obtainable were the teeth in the same plane.

A practical embodiment of the invention is hereinafter described and is shown in the accompanying drawings, in which.

Figure 1:
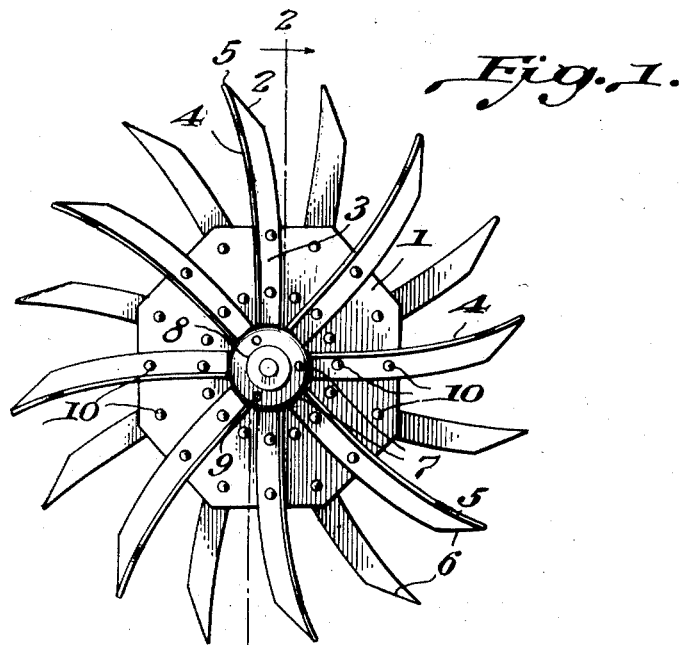
Figure 1 is a side view.
Figure 2:
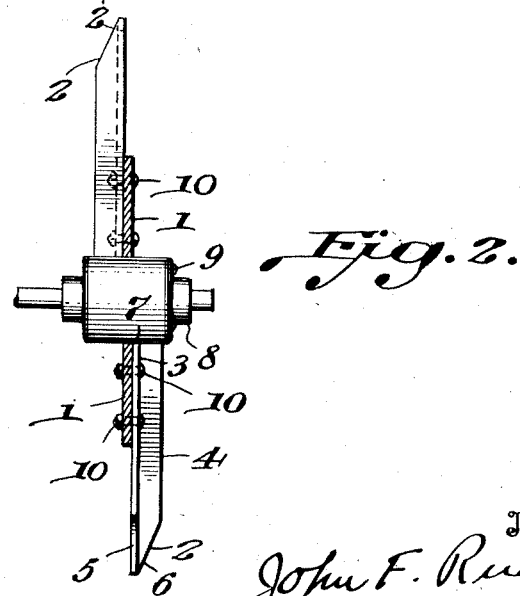
Fig. 2 is a section on the line 2—2, Fig. 1.

The present invention having to do solely with the spider wheel construction and not the manner in which the wheel is carried by the harrow or agricultural machine, and as my spider wheel is adapted for use on the harrow set forth in my Patent No. 1,689,053, as well as on other harrows or cultivators or agricultural machines, a showing and description of the improved wheel alone, will suffice.

The wheel has a metal disc 1 which, as shown, is of octagonal form but this disc may be of any other polygonal form or it may be circular.

The teeth 2 are of angle steel in cross sectional shape, being provided with straight parts 3 that have one web lying flat against the disc 1, and curved parts 4 which terminate in a point 5. The webs are cut away or bevelled off and converge to the point 5.

There are two sets of teeth respectively arranged on opposite sides of the disc 1 so that, in alternation, considered circumferentially of the disc 1, the teeth are located first on one side of the disc and then on the other side.

The inner ends 7 of the teeth are squared off and abut the central hub which extends out on opposite sides of the disc 1 and is secured thereto by suitable fastenings or rivets 9.

The straight parts of the teeth are secured to the disc 1 by rivets, screws, or bolts 10.

Ordinary spider wheels or rotary hoes as heretofore known to the art, have been of malleable metal.

As distinguished from earlier constructions, the teeth of my spider wheel are of high carbon angle steel and they are sharpened as they enter the soil. The teeth insure better penetration than is obtainable with malleable teeth. No seats for the teeth being provided nor being necessary, the construction is simple, strong, durable and inexpensive to produce. Inasmuch as each tooth is secured by a plurality of rivets or fasteners 10 and the inner end of the tooth abuts the hub 8, the teeth are very strongly attached to the hub and better withstand the resistance and strains which they encounter than will teeth otherwise constructed. In addition to these advantages, the teeth may be readily removed and others substituted in the event of injury.

What I claim is:

1. A spider wheel or rotary hoe comprising a tooth carrying structure having a hub, angle steel pointed teeth, fastenings rigidly securing said teeth to said structure, the inner ends of said teeth being engaged with the hub thereby relieving the fastenings of strain.

2. A spider wheel or rotary hoe comprising a tooth carrying structure having a hub, angle steel pointed teeth, fastenings rigidly securing said teeth to the outer face of said structure, the inner ends of said teeth abutting the periphery of the hub, thereby relieving the fastenings of the strain.

3. A spider wheel or rotary hoe having a body, teeth formed of angle steel stock, fastenings rigidly connecting the teeth to said body, said teeth having their inner ends abutting the body, thereby relieving the fastenings of strain.

4. A spider wheel or rotary hoe having a body, teeth formed of angle steel stock having pointed ends, fastenings rigidly connecting the teeth to said body, said teeth having their inner ends abutting the body, thereby relieving the fastenings of strain.

5. A spider wheel or rotary hoe having a body, teeth formed of angle steel stock having curved and pointed ends, both of the webs of the stock of the teeth being cut away and converging to the points of said teeth, fastenings rigidly connecting the teeth to said body, said teeth having their inner ends abutting the body, thereby relieving the fastenings of strain.

6. A spider wheel or rotary hoe comprising a disc having a hub, and two series of angle-steel pointed teeth, the teeth of the respective series being located on opposite sides of the disc and lying against, and secured to, the outer surfaces of the disc, whereby the teeth of one series are arranged in alternation to those of the other series.

7. A spider wheel or rotary hoe comprising a disc having a hub at its central part extending out on opposite sides of said disc, and two series of teeth, the teeth of the respective series being located on opposite sides of the disc and rigidly secured thereto, whereby the teeth of one series are arranged in alternation to those of the other series, said teeth having squared inner ends which abut the hub.

8. A spider wheel or rotary hoe comprising a disc having a removable hub with flanged parts on each side of said disc, two series of teeth, formed right and left, of angle steel stock, the two series of teeth being located on opposite sides of the disc and rigidly secured thereto, whereby the teeth of one series are arranged in alternation to those of the other series, the out-turned wings and the angle steel teeth facing the direction of rotation, said angle steel teeth having the webs of the stock cut away, forming pointed outer ends, and the inner ends abutting the periphery of the removable hub.

In testimony whereof I affix my signature.

JOHN F. RUDE.